US012252894B2

(12) United States Patent
Lao Hernández

(10) Patent No.: US 12,252,894 B2
(45) Date of Patent: Mar. 18, 2025

(54) MODULAR COLUMBARIUM FOR STORING FUNERARY URNS

(71) Applicant: Coral Smart Invex, S.L., Barcelona (ES)

(72) Inventor: Manuel Lao Hernández, Barcelona (ES)

(73) Assignee: Coral Smart Invex, S.L., Barcelona (ES)

( * ) Notice: Subject to any disclaimer, the term of this patent is extended or adjusted under 35 U.S.C. 154(b) by 652 days.

(21) Appl. No.: 17/271,229

(22) PCT Filed: Aug. 1, 2019

(86) PCT No.: PCT/ES2019/070548
§ 371 (c)(1),
(2) Date: Feb. 25, 2021

(87) PCT Pub. No.: WO2020/043924
PCT Pub. Date: Mar. 5, 2020

(65) Prior Publication Data

US 2021/0246684 A1 Aug. 12, 2021

(30) Foreign Application Priority Data

Aug. 29, 2018 (ES) ............................ ES201831319U

(51) Int. Cl.
*E04H 13/00* (2006.01)
*A61G 17/08* (2006.01)

(52) U.S. Cl.
CPC ........... *E04H 13/006* (2013.01); *A61G 17/08* (2013.01)

(58) Field of Classification Search
CPC .............................. E04H 13/006; A61G 17/08
See application file for complete search history.

(56) References Cited

U.S. PATENT DOCUMENTS 741,355 A * 10/1903 Mathews .............. E04H 13/005 52/132
1,887,086 A * 11/1932 Erickson ............... E04H 13/006 312/138.1

(Continued)

FOREIGN PATENT DOCUMENTS

WO WO 2020/043924 3/2020

OTHER PUBLICATIONS

International Preliminary Report on Patentability Dated Jul. 27, 2020 From the International Preliminary Examining Authority Re. Application No. PCT/ES2019/070548. (16 Pages).

(Continued)

*Primary Examiner* — Gisele D Ford

(57) ABSTRACT

A modular columbarium for storing funerary urns, comprising a plurality of individual containers able to be coupled together in a matrix arrangement, preferably in rows and columns. Said individual containers are each made up of a part made from injection-mouldable plastic material defined by a base and side walls, such that it defines an inner space provided to house at least one funerary urn, wherein each container includes removable closing means provided to close off the inner space from the outside, wherein the closing means include at least one inner door which isolates the inner space from the outside environment, the inner door having releasable locking means and a male-female coupling system for the joining thereof to the individual container.

12 Claims, 12 Drawing Sheets

(56) References Cited

U.S. PATENT DOCUMENTS

| | | | | | |
|---|---|---|---|---|---|
| 3,550,337 | A * | 12/1970 | Lorenz | E04H 13/006 | 52/510 |
| 3,754,805 | A * | 8/1973 | Pangburn | F16B 12/18 | 211/84 |
| 3,888,055 | A * | 6/1975 | Gallo | E04H 13/006 | 52/378 |
| 3,958,378 | A * | 5/1976 | Omeechevarria | E04H 13/006 | 52/79.9 |
| 3,986,308 | A * | 10/1976 | Jones | E04H 13/006 | 52/745.03 |
| 4,033,545 | A * | 7/1977 | Duwe | E04H 13/006 | 249/102 |
| 4,102,098 | A | 7/1978 | Duwe et al. | | |
| 4,356,920 | A | 11/1982 | Van der Schoot | | |
| 4,644,711 | A * | 2/1987 | Eickhof | E04H 13/006 | 52/235 |
| 5,115,607 | A * | 5/1992 | Pirozzoli | E04H 13/006 | 52/741.1 |
| 5,195,812 | A * | 3/1993 | Eickhof | A47B 47/0091 | 312/257.1 |
| 5,243,794 | A * | 9/1993 | Pikor | E04H 13/006 | 52/79.9 |
| 5,287,603 | A | 2/1994 | Schorman | | |
| 5,419,091 | A * | 5/1995 | Roberts | E04H 13/006 | 52/509 |
| 5,477,594 | A * | 12/1995 | LePage | E04H 13/006 | 211/84 |
| 5,740,637 | A * | 4/1998 | Snow | E04H 13/006 | 52/603 |
| 5,894,699 | A * | 4/1999 | Fulton | E04H 13/006 | 52/134 |
| 5,953,865 | A * | 9/1999 | Rickards | E04H 13/006 | 52/235 |
| 6,105,315 | A * | 8/2000 | Stoecklein | E04H 13/006 | 52/439 |
| 6,347,439 | B1 * | 2/2002 | Bach Lahor | E04H 13/006 | 52/134 |
| 6,564,514 | B1 * | 5/2003 | Rickards | E04H 13/006 | 52/509 |
| 6,578,323 | B1 * | 6/2003 | Zartman | E04H 13/006 | 52/129 |
| 6,944,921 | B1 * | 9/2005 | Gersten | E04H 13/008 | 27/1 |
| 2002/0092247 | A1 | 7/2002 | Thomas et al. | | |
| 2004/0177570 | A1 * | 9/2004 | Stienwand | E04H 13/006 | 52/133 |
| 2006/0179622 | A1 * | 8/2006 | Min | E04H 13/006 | 27/1 |
| 2006/0207075 | A1 * | 9/2006 | Davis | A61G 17/08 | 27/1 |
| 2007/0033885 | A1 * | 2/2007 | Freeman | E04H 13/006 | 52/103 |
| 2007/0175110 | A1 * | 8/2007 | Bosisio | E04H 13/008 | 52/134 |
| 2007/0261331 | A1 * | 11/2007 | Rickards | E04F 13/0839 | 52/235 |
| 2008/0196225 | A1 * | 8/2008 | Pruitt | A61G 17/0405 | 27/1 |
| 2009/0229197 | A1 * | 9/2009 | Bach Lahor | E04H 13/006 | 52/142 |
| 2010/0165639 | A1 * | 7/2010 | Skeele | E04H 13/006 | 362/326 |
| 2010/0275529 | A1 * | 11/2010 | Bridgemen | E04H 13/006 | 52/134 |
| 2010/0300016 | A1 * | 12/2010 | Eickhof | E04H 13/006 | 52/587.1 |
| 2012/0167488 | A1 * | 7/2012 | Eickhof | E04H 13/006 | 52/139 |
| 2013/0199111 | A1 | 8/2013 | Eickhof et al. | | |
| 2015/0308141 | A1 * | 10/2015 | Ugartechea Berlanga | E04H 13/008 | 52/135 |
| 2016/0356055 | A1 * | 12/2016 | Trousil | E04H 13/006 | |
| 2017/0183889 | A1 * | 6/2017 | Rossi | E04H 13/008 | |
| 2017/0211291 | A1 * | 7/2017 | Eickhof | A61G 17/08 | |
| 2018/0202184 | A1 * | 7/2018 | Rossi | E04H 13/008 | |
| 2018/0223558 | A1 * | 8/2018 | Birkmeier | E04H 13/008 | |
| 2018/0283035 | A1 * | 10/2018 | Mercer | E05B 65/0057 | |

OTHER PUBLICATIONS

International Search Report and the Written Opinion Dated Nov. 25, 2019 From the International Searching Authority Re. Application No. PCT/ES2019/070548. (17 Pages).

Plastic BoxShop "Pack of 5—35 Litre Crystal Plastic Storage Boxes With Lids", Plastic BoxShop, XP002795551, 1 P., Jul. 19, 2017.

* cited by examiner

MODULAR COLUMBARIUM FOR STORING FUNERARY URNS

RELATED APPLICATIONS

This application is a National Phase of PCT Patent Application No. PCT/ES2019/070548 having International filing date of Aug. 1, 2019, which claims the benefit of priority of Spanish Patent Application No. U201831319 filed on Aug. 29, 2018. The contents of the above applications are all incorporated by reference as if fully set forth herein in their entirety.

FIELD AND BACKGROUND OF THE INVENTION

The object of the present application is to register a modular columbarium for storing funerary urns, as well as a container for the manufacture thereof.

More specifically, the invention proposes the development of a modular columbarium for storing funerary urns which is made with parts made of a plastic material with high strength and durability, which enables the manufacture and assembly thereof to be simplified.

Currently, the practice of cremating or incinerating the corpse of deceased persons is becoming more and more widespread, with the ashes obtained being arranged to be conserved in a container which enables the family or persons close to the deceased person to have a memento of the deceased person instead of them being spread over a location. These containers with the ashes contained therein can be stored in especially designed places in a grouped manner which are called columbaria. These columbaria can be found in buildings especially designed to this end, or in other places of worship, such as, for example, chapels, sports venues, houses of worship, etc.

Columbaria known in the state of the art are made up of a modular support structure, made of metal material, formed by vertical panels and horizontal crossbars coupled to each other, which define a plurality of housings or compartments distributed in a matrix in rows and columns.

However, this modular configuration involves designing the dimensions of panels as well as the crossbeams beforehand, since once it is installed it is not possible to adapt the dimensions, meaning, reducing or increasing the dimensions thereof without this involving handling or substituting the panels, which requires more handling time and higher costs.

Furthermore, the applicant is currently unaware of an invention that has all the features described in this specification.

SUMMARY OF THE INVENTION

The present invention has been developed with the aim of providing a modular columbarium which is configured as a novelty within the field of application and solves the previously mentioned drawbacks, also contributing other additional advantages that will be obvious from the description below.

It is therefore an object of the present invention to provide a modular columbarium for storing funerary urns, of the type comprising a plurality of individual containers able to be coupled together in a matrix arrangement, preferably in rows and columns. In particular, the invention is characterised in that the individual containers are made up of a part made from injection-mouldable plastic material defined by a base and side walls, such that it defines an inner space provided to house at least one funerary urn, wherein each container includes removable closing means provided to close off the inner space from the outside.

Thanks to these features, it is possible to design a columbarium in a simple and economical manner, since the containers are made from plastic material, which simplifies and reduces the manufacturing costs.

According to another aspect of the invention, the closing means include at least one inner door which isolates the inner space from the outside environment, the inner door having releasable locking means and a male-female coupling system for the joining thereof to the individual container.

Preferably, the releasable means have a rotary latch with a projection, the projection being able to be inserted into a locking element able to be fastened in a housing located in the outer rim of the individual container, the latch including at least one hole made up of a predetermined shape provided for the insertion of a specialised tool with a shape complementary to that of the hole.

Also preferably, the locking element is fastened on a contact surface present on the rim of the individual container by clipping means.

According to another aspect of the invention, each individual container has a surface on the side walls thereof provided with a plurality of reinforcing ribs which provide the container with greater rigidity, which enables a greater weight to be supported, thus preventing the individual container from being deformed as it is used.

Advantageously, the individual containers can incorporate at least one dividing wall able to be removably assembled inside the individual container which divides the inner space into sub-compartments.

Additionally, the columbarium of the invention may include guide means present on the inner portion of the individual container wherein at least one dividing wall is slidable.

In a preferred embodiment of the invention, the guide means consist of cavities which run through the inside of side walls facing each other, wherein the dividing wall has a protruding rim at each of the opposite ends thereof having dimensions suitable to fit into the corresponding cavities.

Advantageously, the inner door incorporates a substantially laminar decorative element on an outer face. In particular, the decorative element can be made from stone material, preferably marble.

Furthermore, the columbarium object of the invention can include securing means for holding the individual containers together. In a particular embodiment, the securing means comprise a plurality of rods (3) which pass through channels (25) made in the outer face of the side walls in each of the individual containers (2).

Preferably, the rod has at least one threaded portion.

It should be mentioned that another object of the invention is to provide an individual container for constructing a columbarium that is made up of a part made from injection-mouldable plastic material defined by a base and side walls, such that it defines an inner space provided to house at least one funerary urn, and removable closing means provided to close off the inner space from the outside.

In a preferred embodiment, the closing means include at least one inner door which isolates the inner space from the outside environment, the inner door having releasable locking means and a male-female coupling system for the joining thereof to the part making up the individual container.

Other features and advantages of the modular columbarium object of the present invention will be evident in light of the description of a preferred, but not exclusive, embodiment which is illustrated by way of non-limiting example in the drawings which are attached, wherein:

DESCRIPTION OF SPECIFIC EMBODIMENTS OF THE INVENTION

In light of the aforementioned figures, and in accordance with the adopted numbering, one may observe therein an example of a preferred embodiment of the invention, which comprises the parts and elements indicated and described in detail below.

Figure 1:
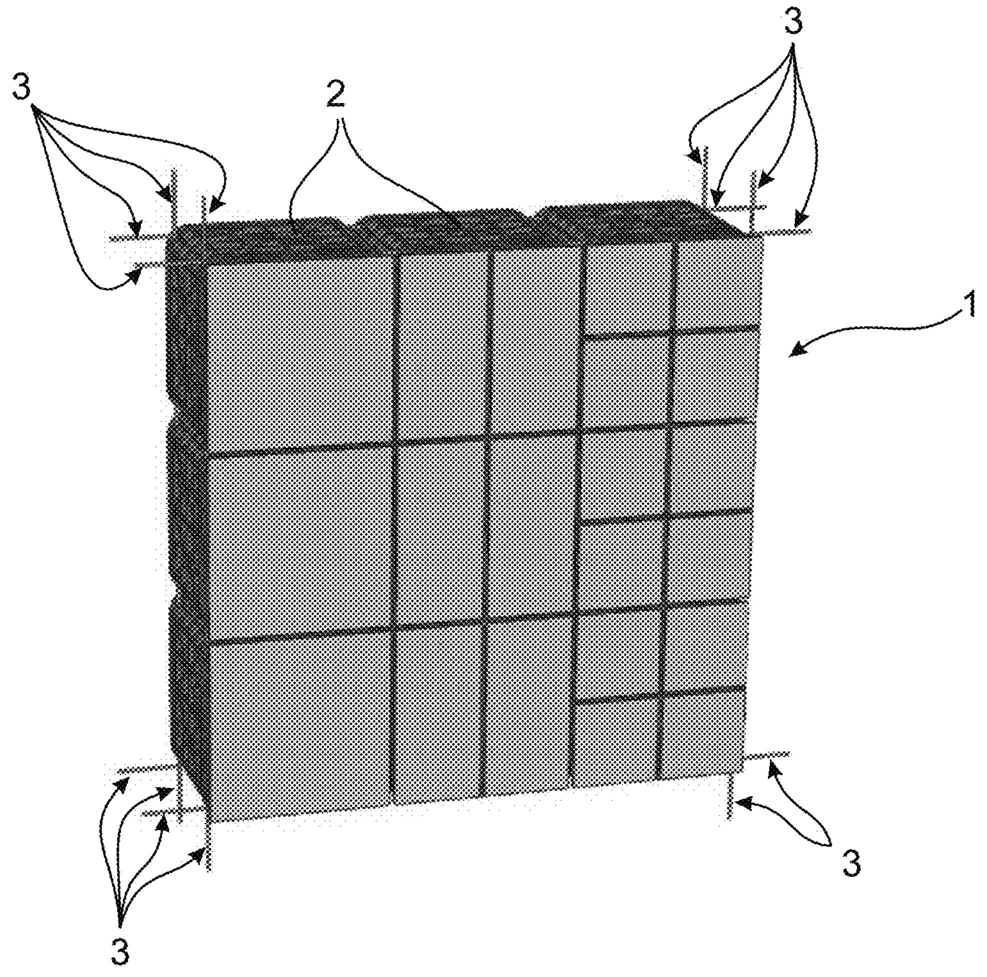
FIG. 1 is a perspective view of an embodiment of a modular columbarium according to the present invention.

As shown in FIG. 1, a modular columbarium for storing funerary urns is represented, generally indicated with the reference (1), which comprises a plurality of individual containers (2) able to be coupled together in a matrix arrangement, in a plurality of rows and columns.

Figure 2:
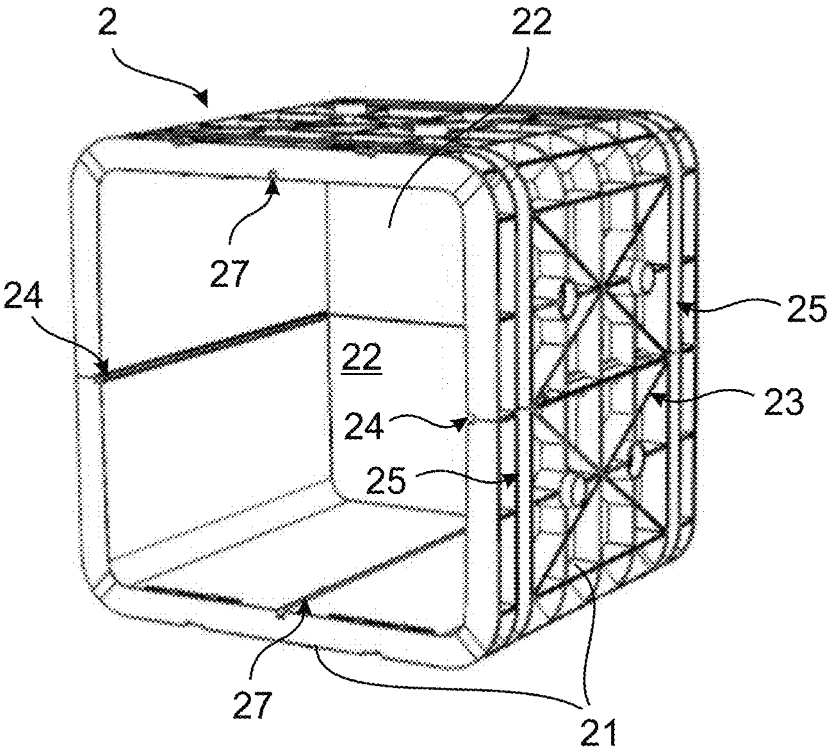
FIG. 2 is a front perspective view of an individual container that forms part of the modular columbarium according to the present invention.
Figure 3:
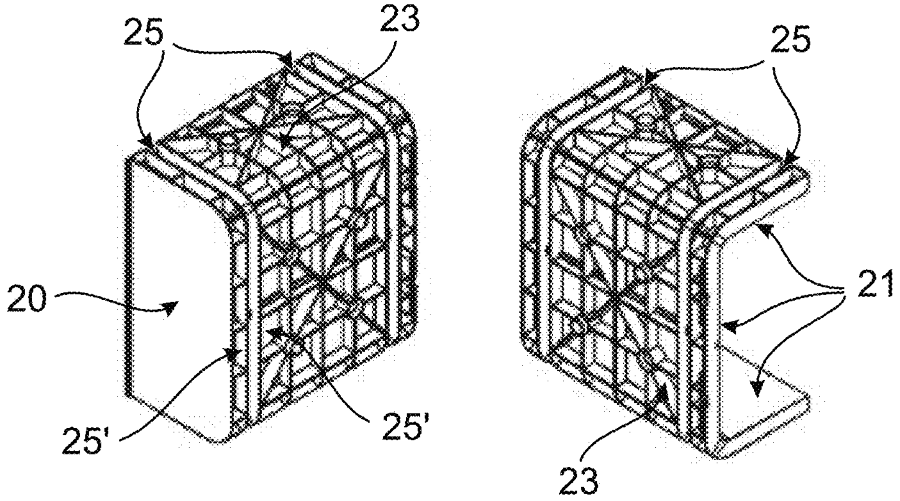
FIG. 3 is a rear perspective view of the individual container shown in FIG. 2.

As seen in greater detail in FIGS. 2 and 3, the individual containers (2) are made up of a part made from injection-mouldable plastic material, substantially cube-shaped with rounded corners, defined by a base (20) and a plurality of side walls (21), such that it defines an inner space (22), for example, with dimensions of 28×28.8×29 cm, provided for housing funerary urns (not shown as they do not form part of the object of the invention). It should be mentioned that in a condition of use of the container (1), the base (20) acts as a rear wall.

Each individual container (2) includes removable closing means (described below) provided to close off the inner space from the outside.

It should be noted that each individual container (2) is made up of two halves which are dimensionally complementary to each other, as seen more clearly in FIG. 3, and able to be coupled together by fitting. In this case, the two halves are symmetrical to each other.

The side walls (21) of each individual container (2) have an external surface provided with a plurality of reinforcing ribs (23).

In order to keep the individual containers (2) integrally joined together in order to form the columbarium (1), a plurality of threaded rods (3) are provided which pass through channels (25) made along the outer face of the side walls in each of the individual containers (2). These channels (25) are made up of the ribs (25') that are present. This is illustrated in FIG. 3. Likewise, all of the channels (25) are made up of ribs (25'). While channels (25) appear in multiple instances in multiple figures, the reference numbers for the ribs (25') are omitted as redundant.

In particular reference to the closing means, they include at least one inner door (4), with a general parallelepiped geometrical configuration, which isolates the inner space from the outside environment, the inner door having releasable locking means and a male-female coupling system for the joining thereof to the individual container (2). Thus, the upper and lower ends of each inner door (4) include extensions (40) provided to be fastened on walls of the individual container (2). The number of inner doors (4) will depend on the number of individual inner compartments that each of the individual containers (2) has, and are made from a plastic material that can be the same as or different from the one used in the manufacturing of the individual container (2).

Figure 7:
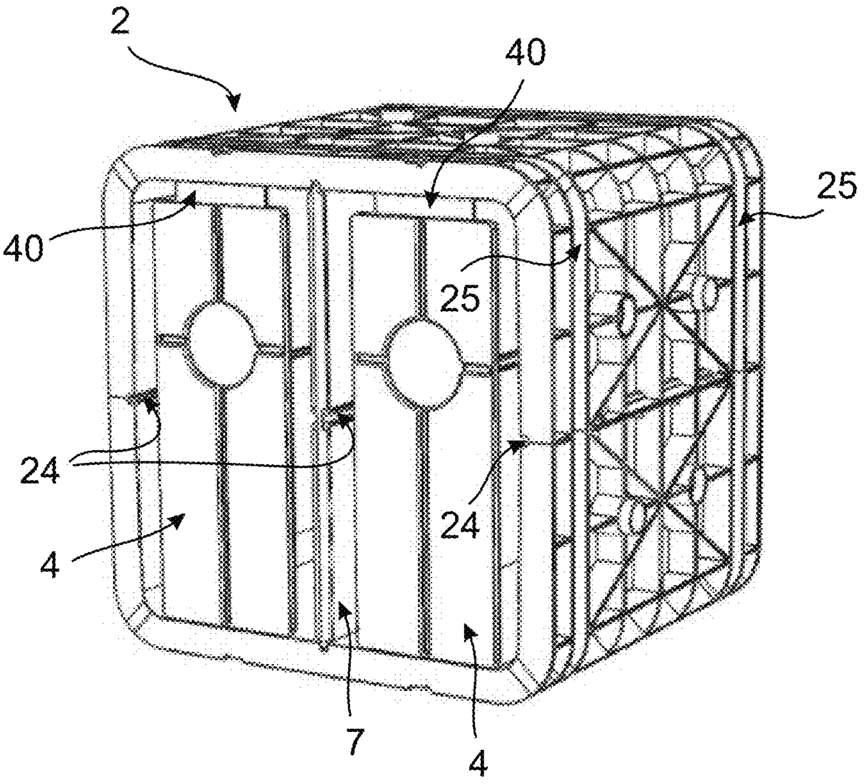
FIG. 7 is a perspective view of an individual container with two front inner doors.
Figure 8:
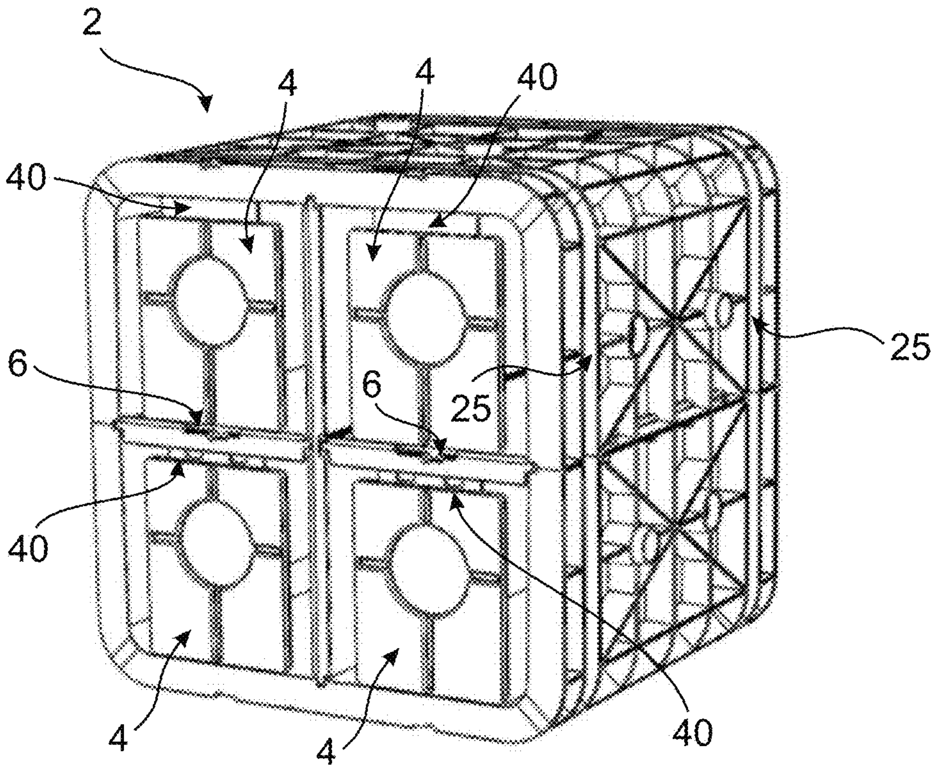
FIG. 8 is a perspective view of a container with four front inner doors.

Thus, for example, FIG. 7 shows how two inner doors (4) linked to two individual compartments are provided, while FIG. 8 shows how four inner doors (4) are arranged, each linked to a respective individual compartment.

Figure 9:
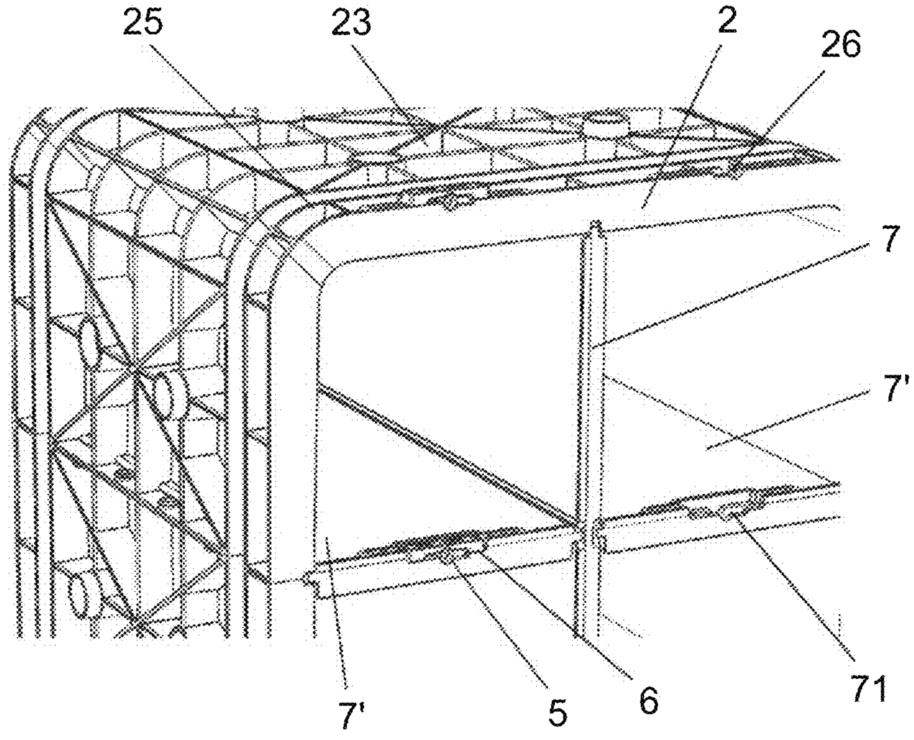
FIG. 9 is a perspective detail view of a container wherein the releasable means can be seen.
Figure 10:
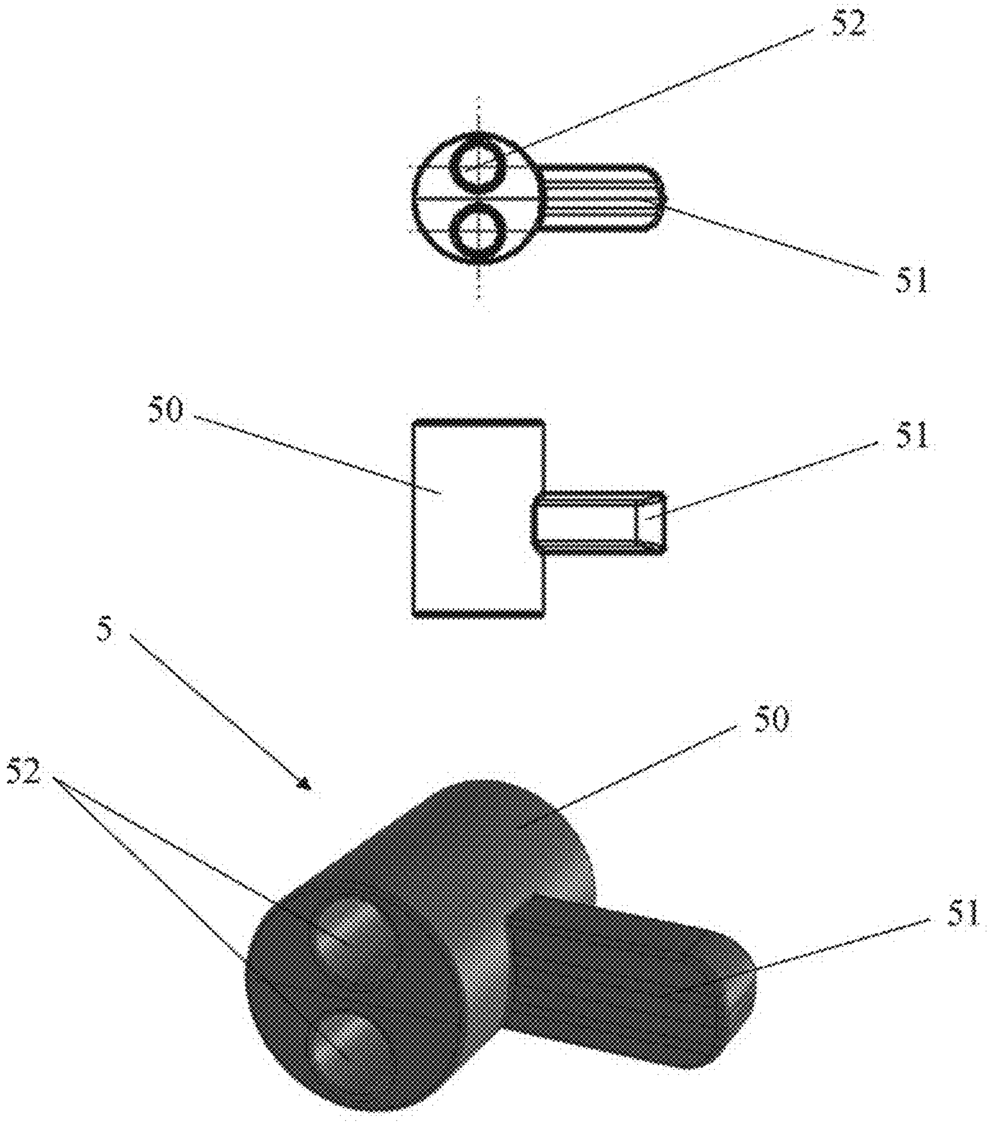
FIG. 10 shows elevation and perspective detail views of the rotary latch that forms part of the releasable means.

As far as the aforementioned releasable means, they have a rotary latch (5) made up of a cylindrical body (50) from which a projection (51) protrudes laterally (see FIG. 10), the projection being able to be inserted into a locking element (6) able to be fastened in a housing (26) located in the outer upper and/or lower rim of the individual container (2). Housings (71) are also provided wherein the locking elements (6) are assembled, as seen in FIG. 9.

In this manner, when the projection (51) is rotated, the removal of the inner door is locked. The rotary latch (5) includes a pair of holes (52) in the cylindrical body (50) with a predetermined shape, provided for the insertion of a specialised tool (not shown) having a region with a shape complementary to that of the aforementioned holes (52), thus enabling the latch to be rotated from an open position to a closed position or vice versa.

Figure 11:
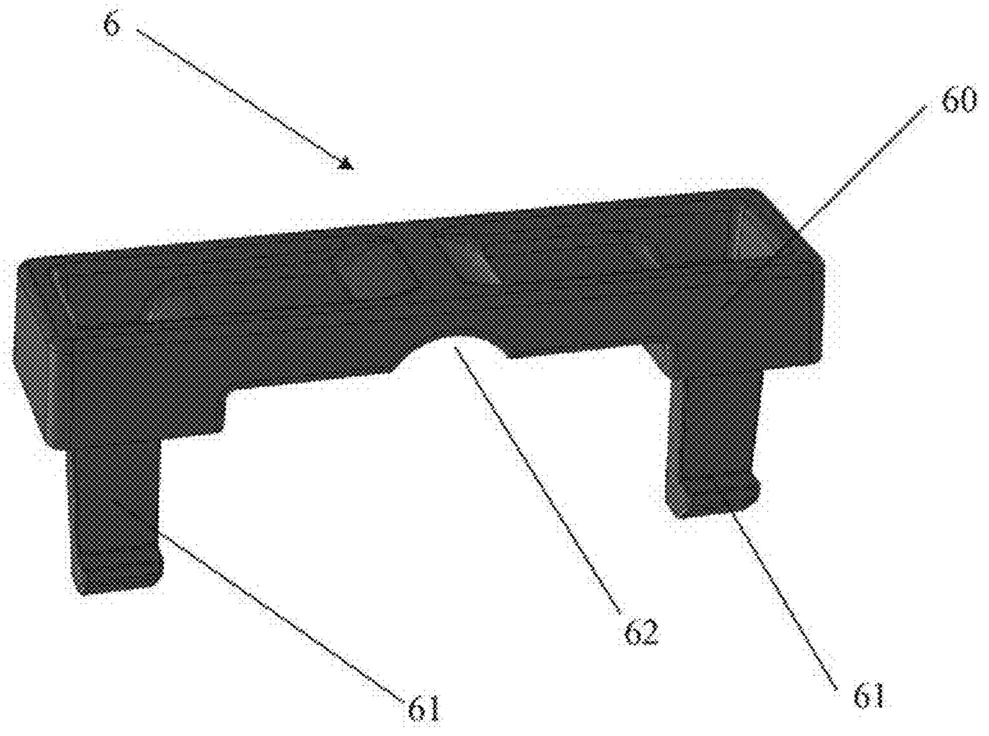
FIG. 11 is a perspective detail view of the locking element that forms part of the releasable means.
Figure 12:
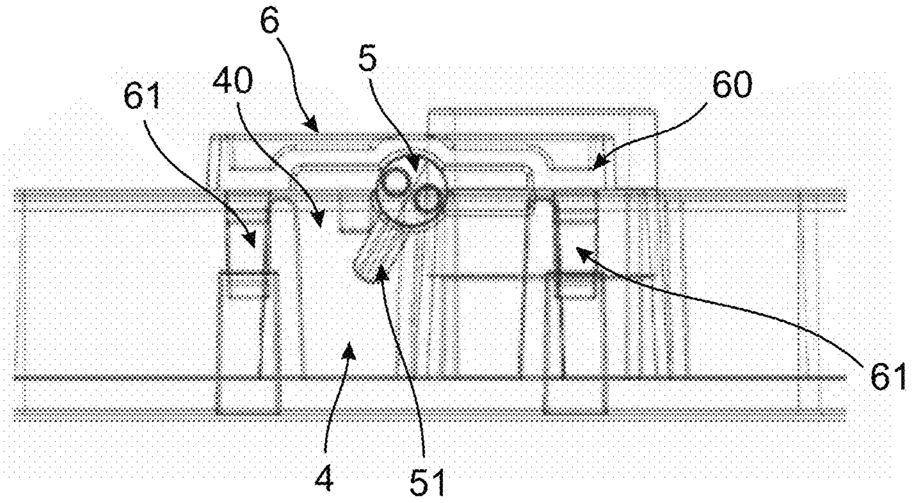
FIG. 12 is a schematic elevation view wherein the rotary latch is arranged in a locking position.

It should be mentioned that the locking element (6) comprises an elongated segment (60) which is fastened to a contact surface present on the rim of the individual container (2) by a pair of clipping flanges (61). As seen in FIGS. 11 and 12, the elongated segment (60) includes a half-moon shaped recess (62) wherein the rotary latch (5) is partially located.

In order to expand the capacity of the number of funerary urns, individual containers can incorporate one or more dividing walls (7) able to be removably assembled inside the individual container which divides the inner space into sub-compartments. Thus, in the example shown in FIG. 4, the inside of the individual container (2) is divided into two sub-compartments by a dividing wall (7), whereas in FIG. 5, two additional dividing walls (7') have been included which are arranged on a horizontal plane.

Figure 4:
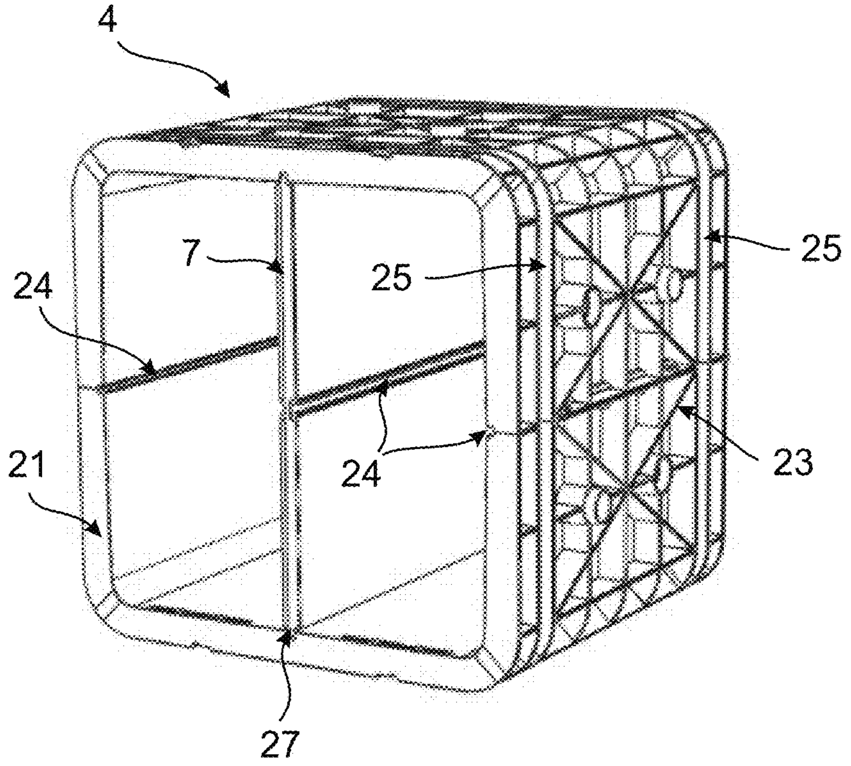
FIG. 4 is a perspective view of the individual container provided with a dividing wall.
Figure 5:
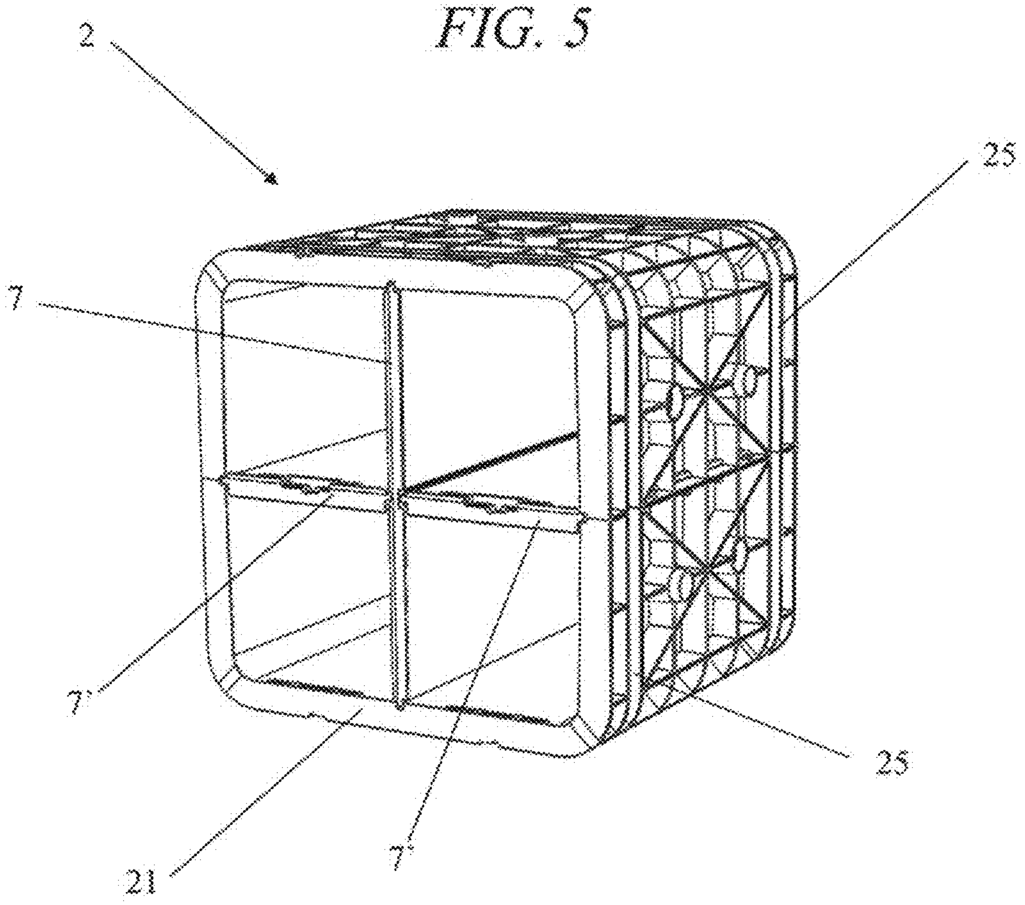
FIG. 5 is a perspective view of the individual container provided with dividing walls arranged in the shape of a cross which define four independent compartments.
Figure 6:
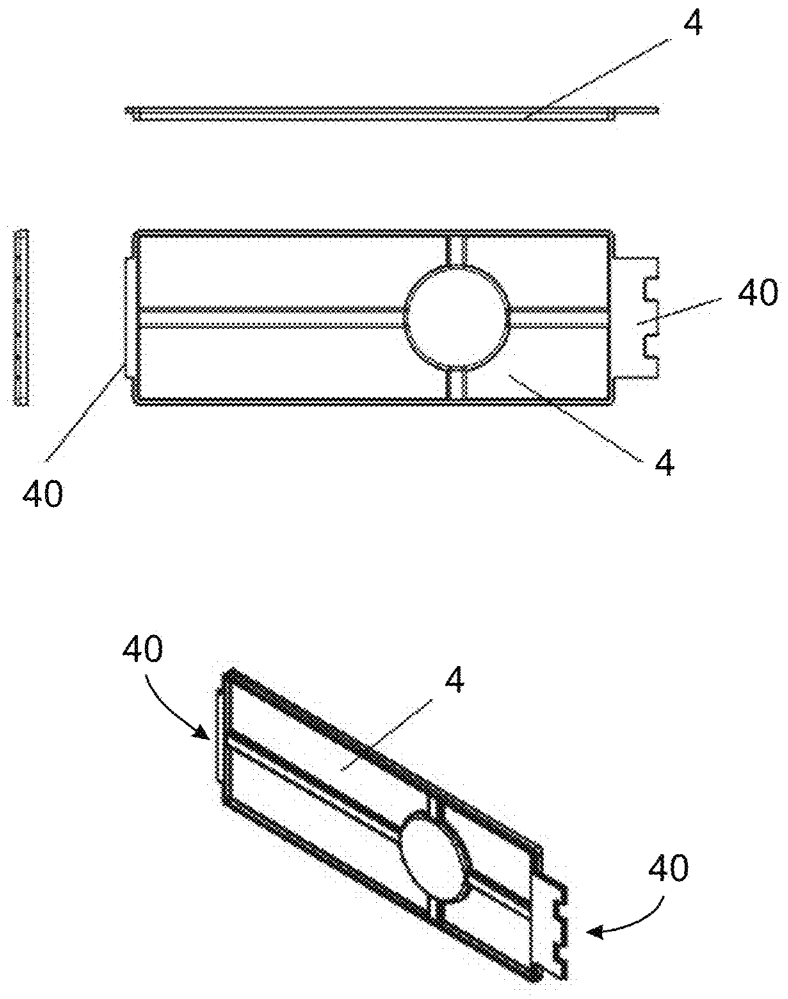
FIG. 6 is a perspective view of an inner door.

Advantageously, guide means present on the inner portion of the individual container are provided wherein the dividing walls (7, 7') can slide for easy assembly and disassembly. In this case, the guide means consist of cavities (24) which run through the inside of side walls (21) facing each other, wherein the dividing wall has a protruding rim (27) at each of the opposite ends thereof having dimensions suitable to fit into the corresponding cavities (24). The guide means are also present in the dividing wall (7) at an intermediate height in order to facilitate the assembly of the dividing walls (7'), as seen in FIG. 4.

In order to improve the aesthetic or visual finish of the columbarium (1), the inner door (4) incorporates a substantially laminar decorative element in the shape of a plate made from stone material, for example, marble, on the outer face thereof (meaning, the one visible from the outside), wherein it is able to be personalised, meaning, it can include an image associated with the ashes of the deceased person.

The details, shapes, dimensions and other accessory elements, used to manufacture the modular columbarium of the invention, may be suitably substituted for others which do not depart from the scope defined by the claims which are included below.

The invention claimed is:

1. A modular columbarium (1) for storing funerary urns, comprising:

a plurality of individual containers (2) which are able to be coupled together in a matrix arrangement in rows and columns, the individual containers (2) are substantially cube-shaped with rounded corners, wherein each of the plurality of individual containers (2) comprises a part made from injection-mouldable plastic material, the part defined by a base (20) and side walls (21), such that the part defines an inner space provided to house at least one funerary urn, wherein each container includes a removable closing means provided to close off the inner space from an outside environment, the closing means includes at least one inner door (4) which isolates the inner space from the outside environment, wherein the at least one inner door (4) for each of the plurality of containers has a releasable locking means and the at least one inner door is adapted for male-female coupling for joining the at least one inner door (4) to each of the plurality of individual containers (2), wherein said male-female coupling comprises male extensions (40) on each of an upper and lower end of each inner door (4) configured to be fastened to respective female portions in the side walls of each of the plurality of individual containers (2), and a securing means for holding the plurality of individual containers (2) together, wherein said securing means comprises a plurality of rods (3), and a plurality of channels, such that each individual container (2) has two channels (25) in the outer face of each of the side walls (21), wherein at least one rod of the plurality of rods passes through one channel (25), and wherein each of the channels (25) is made up of a pair of ribs (23).

2. The modular columbarium (1) according to claim 1, wherein the releasable locking means has a rotary latch (5) with a projection (51), the projection (51) is insertable into a locking element (6), the locking element (6) is configured to be fastened in a housing located in an outer rim of at least one of the plurality of individual containers (2), and the rotary latch (5) has at least one hole of a predetermined shape, wherein the rotary latch (5) projection (51) is able to rotate from an open position to a closed position and from a closed position to an open position.

3. The modular columbarium (1) according to claim 2, wherein the locking element (6) comprises an elongated segment (60) which is fastened to a contact surface present on the outer rim of each individual container (2) by a pair of clipping flanges (61), the elongated segment (60) including a half-moon shaped recess (62) in order to partially house the rotary latch (5).

4. The modular columbarium (1) according to claim 1, wherein each of the side walls comprises a surface that is provided with a plurality of reinforcing ribs.

5. The modular columbarium (1) according to claim 1, wherein at least one of the plurality of individual containers incorporates at least one dividing wall (7) configured to be removably arranged inside the individual container (2) and which divides the inner space into sub-compartments.

6. The modular columbarium (1) according to claim 5, further comprising a guide means provided in an inner face of at least one of the side walls (21) of each individual container (2), wherein the dividing wall (7) is slidably received by the guide means.

7. The modular columbarium (1) according to claim 6, wherein the guide means consists of at least one pair of cavities (24) provided on inside faces of opposing side walls, and wherein the dividing wall (7) has a protruding rim (27) at each of opposite ends thereof having dimensions suitable to receive the dividing wall (7) into the at least one pair of cavities (24).

8. The modular columbarium (1) according to claim 2, wherein the at least one inner door incorporates a substantially laminar decorative element on an outer face.

9. The modular columbarium (1) according to claim 8, wherein the decorative element is made from stone material.

10. The modular columbarium (1) according to claim 1, wherein at least one rod of the plurality of rods (3) has at least one threaded portion.

11. The modular columbarium (1) according to claim 1, wherein the part made from injection-mouldable plastic material comprises two halves which are dimensionally complementary to each other and configured to be coupled together by fitting.

12. The modular columbarium (1) according to claim 9, wherein the decorative element is made from marble.

* * * * *